United States Patent [19]
Lindqvist et al.

[11] Patent Number: 6,075,997
[45] Date of Patent: Jun. 13, 2000

[54] AUTOMATIC CONFIGURATION OF ANTENNA NEAR PARTS EQUIPMENT

[75] Inventors: Dan Lindqvist, Solleatuua; Kristian Lindskog, Kista; Jacob Österling, Järfälla, all of Sweden

[73] Assignee: Telefonaktiebolaget L M Ericsson (publ), Stockholm, Sweden

[21] Appl. No.: 08/962,695

[22] Filed: Nov. 3, 1997

[51] Int. Cl.[7] .................................................. H04Q 7/30
[52] U.S. Cl. ......................... 455/561; 343/908; 343/722; 455/562; 455/129
[58] Field of Search .................................. 455/561, 562, 455/550, 140, 129, 132, 433, 11.1, 31.1, 456, 133; 343/908, 722

[56] References Cited

U.S. PATENT DOCUMENTS

| | | | |
|---|---|---|---|
| 5,170,392 | 12/1992 | Riordan | 370/252 |
| 5,684,859 | 11/1997 | Chanroo et al. | 379/58 |
| 5,745,858 | 4/1998 | Sato et al. | 455/562 |
| 5,854,986 | 12/1998 | Dorren et al. | 455/562 |
| 5,903,826 | 5/1999 | Nowak | 455/277.1 |
| 5,937,333 | 8/1999 | Sexton et al. | 455/73 |

Primary Examiner—Edward F. Urban
Assistant Examiner—CongVan Tran
Attorney, Agent, or Firm—Jenkens & Gilchrist PC

[57] ABSTRACT

Each transmitter/receiver pair of a radio base station is connected via an antenna bus and radio frequency feeder to antenna near parts equipment such as active antennas, boosters and tower mounted amplifiers. Automatic configuration and calibration of the antenna near parts equipment is accomplished by establishing communication between the base station and each of its connected antenna near part components. Each antenna near part component sends its identification to the base station over the antenna bus at power-on. Furthermore, communications selectively sent over the radio frequency feeder are monitored to determine the connectivity between individual transmitter/receiver pairs of the base station and each antenna near parts equipment. These radio frequency feeder communications are further processed to determine calibration data for configuring each antenna near parts equipment for optimal operation.

40 Claims, 5 Drawing Sheets

AUTOMATIC CONFIGURATION OF ANTENNA NEAR PARTS EQUIPMENT

BACKGROUND OF THE INVENTION

1. Technical Field of the Invention

The present invention relates to base stations for mobile communications systems and, in particular, to a method and apparatus for automatically configuring antenna near parts equipment connected to such a base station.

2. Description of Related Art

A radio base station used in, for example, a cellular mobile communications system, includes connected equipment such as transmitters, receivers, attenuators, amplifiers, filters, antennas, and the like antenna near parts equipment. It is important to know how this equipment is connected. One reason such knowledge is important arises in connection with fault reports. The base station must know how the equipment of the base station is connected in order to take proper action following fault detection. For example, if an antenna is faulty, the base station must know the equipment connections in order to turn off the proper transmitter and to direct communications to other transmitter/antenna pairs. More importantly, if the fault affects base station ability to broadcast its control channel, the base stations must know the equipment connections in order to switch the control channel to other equipment. Another reason such knowledge is important arises in connection with optimization of base station performance. In this regard, it is recognized that the equipment used in a base station may have certain radio characteristics. At base station start-up, these characteristics are loaded into a base station database. Proper loading, storage and analysis of this information for all of the included equipment requires that the base station know how the equipment is connected.

The information concerning the connection of equipment for a base station is generally loaded into and stored in an installation database (IDB). In the installation database, information identifying various radio paths are stored. All transmitter paths are stored, with each transmitter path comprising, for example, a transmitter number, a filter number and input port number, and an antenna port number. Similarly, all receiver paths are stored, with each receiver path comprising, for example, an antenna mounted amplifier number, an antenna port number, a filter number and output port number, and a receiver number. In base station installations utilizing active antennas, boosters or tower mounted amplifiers, the installation database further identifies for each transmitter and receiver path the included active antennas, boosters and tower mounted amplifiers.

In accordance with known prior art implementations, manual entry into the installation database is made of the equipment identifications for each transmitter and receiver path. For a large antenna configuration, manual data entry is not preferred as it requires the expenditure of significant time and effort, and is prone to human error. A need exists then for a more efficient and accurate mechanism for updating the installation database.

The individual pieces of equipment may further include components that must be calibrated in accordance with the system configuration for optimal performance. For example, some antenna near parts devices include a variable attenuator component whose applied attenuation must be determined and specified. In prior art implementations, this calibration activity involved manual selections based on human determined approximations. A need exists then for a more efficient and accurate mechanism for optimizing system performance in terms of component calibrations.

SUMMARY OF THE INVENTION

To address the foregoing needs, a method is presented for automatic configuration and calibration of antenna near parts equipment. In accordance with this method, communication is established between a base station and each of its connected antenna near part components. By processing information sent over the established communication, an installation database for the base station is then updated. This is accomplished by having each antenna near part component send its identification to the base station at power-on. Furthermore, communications selectively sent over a radio frequency feeder are monitored to determine the connectivity between individual transmitter/receiver pairs of the base station and each antenna near parts equipment. These radio frequency feeder communications are further processed to determine calibration data for configuring each antenna near parts equipment for optimal operation.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
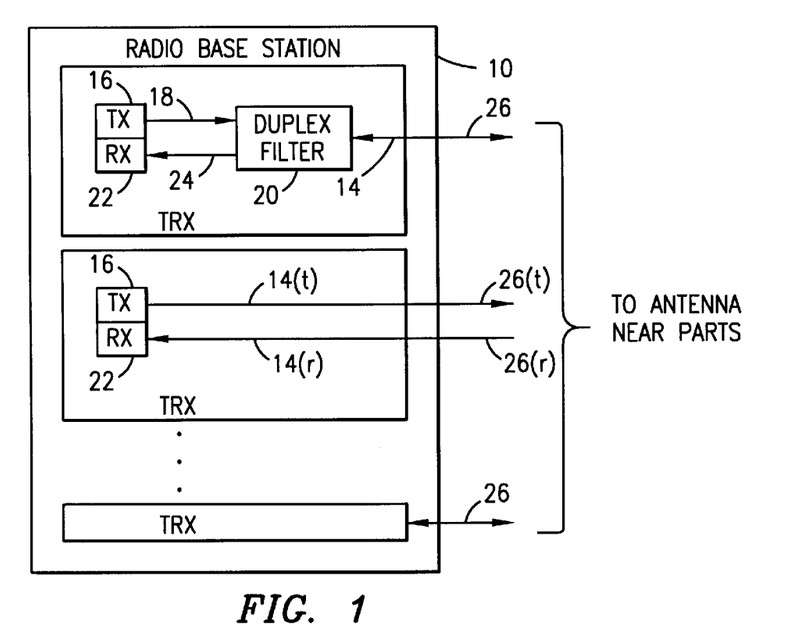
FIG. 1 is a simplified block diagram of a radio base station.

Reference is now made to FIG. 1 wherein there is shown a simplified block diagram of a radio base station 10 utilized in, for example, a cellular-based mobile communications system. The base station 10 includes a plurality of transmitter/receiver pairs (TRXs) 12. Each transmitter/receiver pair 12 includes an antenna port 14. The antenna port 14 may support either a duplex radio frequency feeder (where transmit and receive signals are carried by a single feeder), or a pair of feeders (one each for transmit and receive). Turning first to the duplex operation, within each transmitter/receiver pair 12, a transmitter 16 connects to a transmit port 18 of a duplex filter 20. Furthermore, a receiver 22 connects to a receive port 24 of the same duplex filter 20. Via the antenna port 14 of the duplex filter 20, a connection is made to an antenna (not shown), and more particularly to antenna near parts equipment (also not shown), over a radio frequency feeder 26. Assuming that radio frequency signals output from the transmitter 16 are in a different band than radio frequency signals received by the receiver 22, the duplex filter 20 operates to pass transmit band signals received at the transmit port 18 for output at the antenna port 14, and to pass receive band signals received at the antenna port 14 for output at the receive port 24. Alternatively, the transmitter 16 may be connected through a transmit antenna port 14(*t*) to a transmit radio frequency feeder 26(*t*), with the receiver 22 connected through a receive antenna port 14(*r*) to a receive radio frequency feeder 26(*r*). Via the antenna ports 14(*t*) and 14(*r*) of the transmitter/receiver pair 12, a connection is made to an antenna (not shown), and more particularly to antenna near parts equipment (also not shown), over two radio frequency feeders 26(*t*) and 26(*r*).

Figure 2:
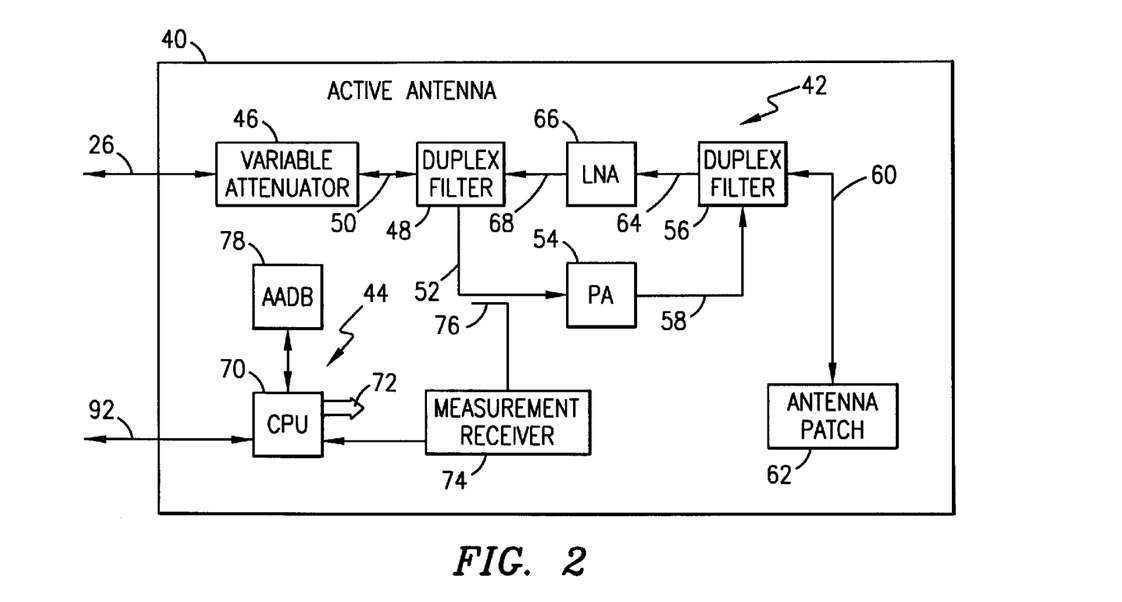
FIG. 2 is a block diagram of an active antenna.

Reference is now made to FIG. 2 wherein there is shown a block diagram of an active antenna 40. The active antenna 40 includes a radio part 42 and a digital part 44. Turning first to the radio part 42, it functions to amplify transmit signals received over a radio frequency feeder 26 from the transmitter/receiver pair 12 of a base station 10 (see, FIG. 1) for broadcast, and to receive broadcast radio frequency signals and amplify them for reception by the transmitter/receiver pair of the base station. With respect to a transmit signal generated by the transmitter 16 (see, FIG. 1), it first passes through a variable attenuator 46 which applies a selected attenuation to the signal to compensate for a lower than nominal feeder attenuation associated with the radio frequency feeder 26. The variable attenuator 46 need not be included in the active antenna 40 if only a single active antenna is connected to its associated transmitter/receiver pair 12, or if multiple active antennas with similar feeder attenuation are connected to the same transmitter/receiver pair. Next, the transmit signal is routed by a first duplex filter 48 from a common port 50 to a transmit port 52 for application to a power amplifier (PA) 54. The amplified transmit signal output from the power amplifier 54 is then routed by a second duplex filter 56 from a transmit port 58 to a common port 60 for broadcast by an antenna patch 62. With respect to a receive signal received by the antenna patch 62, it is routed by the second duplex filter 56 from the common port 60 to a receive port 64 for application to a low noise amplifier (LNA) 66. Next, the receive signal is routed by the first duplex filter 48 from a receive port 68 to the common port 50 for passage through the variable attenuator 46 which applies the same selected attenuation to the signal to compensate for the lower than nominal feeder attenuation associated with the radio frequency feeder 26.

Turning next to the digital part 44, the active antenna 40 includes a central processing unit (CPU) 70 which operates to control operation of the active antenna. In particular, through command signals output on bus 72, the central processing unit 70 controls the on/off status of the power amplifier 54 and sets the selected attenuation provided by the variable attenuator 46. The central processing unit 70 further receives output from a measurement receiver 74 operating to measure transmitter power. The measurement receiver 74 utilizes a directional coupler 76 to make power measurements on the transmit signal output from the transmit port 52 of the first duplex filter 48 for application to the power amplifier 54. The directional coupler 76 may be positioned at any selected location on the base station side of the amplifier 54, including before and after the attenuator 46. The digital part 44 of the active antenna 40 further includes an active antenna database (AADB) 78 connected to the central processing unit 70. The active antenna database 78 stores radio characteristic information for that active antenna 40 including information on: the frequency dependency of the active antenna gain; the frequency range of the active antenna (if not the whole band); the attenuation of the transmit path when the power amplifier is turned off; the amplitude measurement range of the measurement receiver; the measurement time (worst case) of the measurement receiver; and the range of the variable attenuator.

Figure 3:
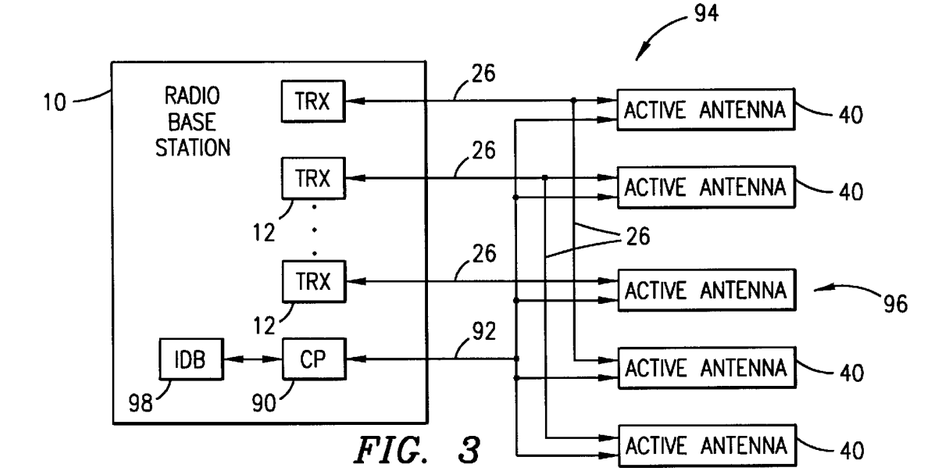
FIG. 3 is a block diagram of a communications system comprising a plurality of active antennas connected to a radio base station.

Reference is now made in combination to FIGS. 1 and 2, as well as to FIG. 3 wherein there is shown a block diagram of a communications system comprising a plurality of active antennas (AA) 40 connected to a radio base station 10. The radio base station 10 further includes a control processor (CP) 90 which operates, in general, to control operation of the radio base station and, in particular, to control operation of each of the included transmitter/receiver pairs 12. The control processor 90 of the radio base station 10 is connected for data communication to the central processing unit 70 of each active antenna 40 via an antenna bus 92. In the preferred embodiment, the antenna bus 92 is shared by all active antennas 40. Alternatively, an antenna bus may be provided between each transmitter/receiver pair 12 and its connected active antennas 40. Each of the included radio frequency feeders 26 may be either utilized in a shared fashion to connect a single transmitter/receiver pair 12 to plural active antennas 40, as generally shown at 94, or utilized to connect a single transmitter/receiver pair 12 to a single active antenna, as generally shown at 96.

Connected to the control processor 90 of the radio base station 10 is an installation database (IDB) 98 which stores information concerning the connection of equipment for that base station. The installation database 98 may store information identifying the transmitter and receiver radio paths for the connected transmitter/receiver pairs 12 and antenna near parts equipment (such as the active antennas 40). An example transmitter path may comprise a transmitter number, a filter number and input port number, an antenna port number and an active antenna number. An example receiver path may comprise an active antenna number, an antenna port number, a filter number and output port, and a receiver number.

Figure 4:
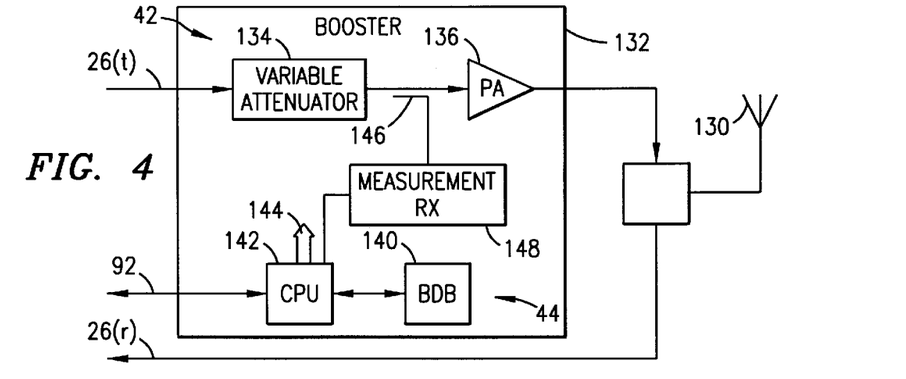
FIG. 4 is a block diagram of a booster and passive antenna.

Reference is now made to FIG. 4 wherein there is shown a block diagram of a booster 132 and passive antenna 130. The booster 132 includes a radio part 42 and a digital part 44. Turning first to the radio part 42, it functions to amplify transmit signals received over a radio frequency feeder 26 from the transmitter/receiver pair 12 of a base station 10 (see, FIG. 1) for broadcast. With respect to a transmit signal generated by the transmitter 16 (see, FIG. 1), it first passes through a variable attenuator 134 which applies a selected attenuation to the signal to compensate for a lower than nominal feeder attenuation associated with the radio frequency feeder 26. The variable attenuator 134 need not be included in the booster 132 if only a single passive antenna 130 is connected to its associated transmitter/receiver pair 12, or if multiple passive antennas with similar feeder attenuation are connected to the same transmitter/receiver pair. Next, the transmit signal is amplified by a power amplifier 136 situated in the transmitter path between the radio base station and the antenna. A booster 132 does not require duplex functionality. Accordingly, the radio frequency feeder 26 connection between a transmitter/receiver pair 12 and a passive antenna 130 may utilize a transmit feeder 26(*t*) separate from a receive feeder 26(*r*).

Turning next to the digital part 44, booster 132 further includes a booster database (BDB) 140 connected to a central processing unit 142. The booster database 140 stores radio characteristic information including information on: the frequency dependency of the booster gain; and the frequency range of the booster (if not the whole band); the attenuation of the transmit path when the power amplifier is turned off; the amplitude measurement range of the measurement receiver; the measurement time (worst case) of the measurement receiver; and the range of the variable attenuator. The central processing unit 142 further receives output from a measurement receiver 148 operating to measure transmitter power. The measurement receiver 148 utilizes a directional coupler 146 to make power measurements on the transmit signal output from the variable attenuator 134 for application to the power amplifier 136. The directional coupler 146 may be positioned at any selected location on the base station side of the power amplifier 136, including before and after the attenuator 134. The central processing unit 142 functions to control (through command signals output on bus 144) the attenuation provided by the attenuator 134, control the amplification provided by the power amplifier 136, and read information from the database 140.

Figure 5:
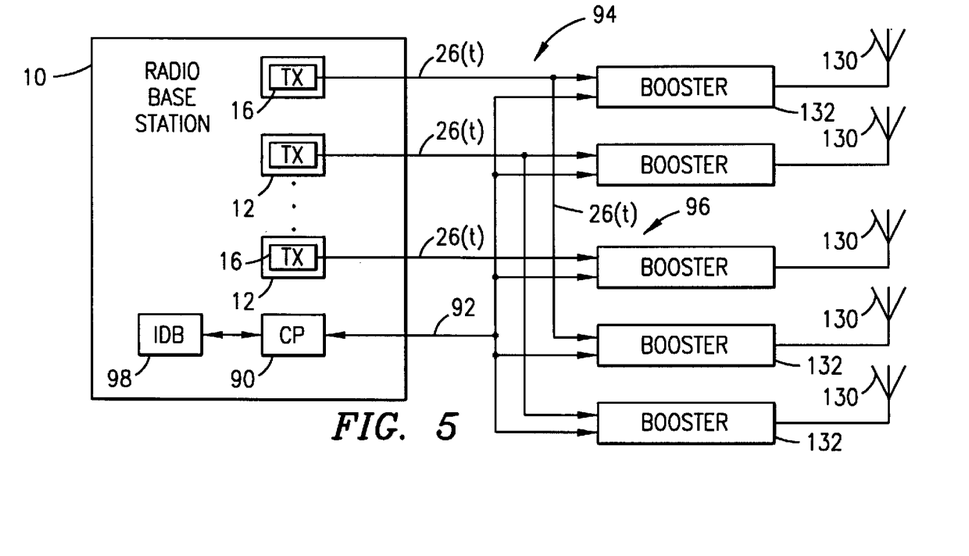
FIG. 5 is a block diagram of a communications system comprising a plurality of passive antennas connected to a radio base station through boosters.

Reference is now made in combination to FIGS. 1 and 4, as well as to FIG. 5 wherein there is shown a block diagram of a communications system comprising a plurality of passive antennas 130 connected to a radio base station 10 through boosters 132. The control processor 90 of the radio base station 10 is connected for data communication to the central processing unit 142 of each booster 132 via an antenna bus 92. In the preferred embodiment, the antenna bus 92 is shared by all boosters 132. Alternatively, an antenna bus may be provided between each transmitter/receiver pair 12 and its connected boosters 132. Each of the included radio frequency feeders 26 may be either utilized in a shared fashion to connect a single transmitter/receiver pair 12 to plural boosters 132, as generally shown at 94, or utilized to connect a single transmitter/receiver pair 12 to a single booster, as generally shown at 96.

The installation database (IDB) 98 stores information concerning the connection of equipment for the base station. The installation database 98 may store information identifying the transmitter and receiver radio paths for the connected transmitter/receiver pairs 12 and antenna near parts equipment (such as the boosters 132). An example transmitter path may comprise a transmitter number, a filter number and input port number, an antenna port number and a booster number. An example receiver path may comprise a tower mounted amplifier number, an antenna port number, a filter number and output port, and a receiver number.

Figure 6:
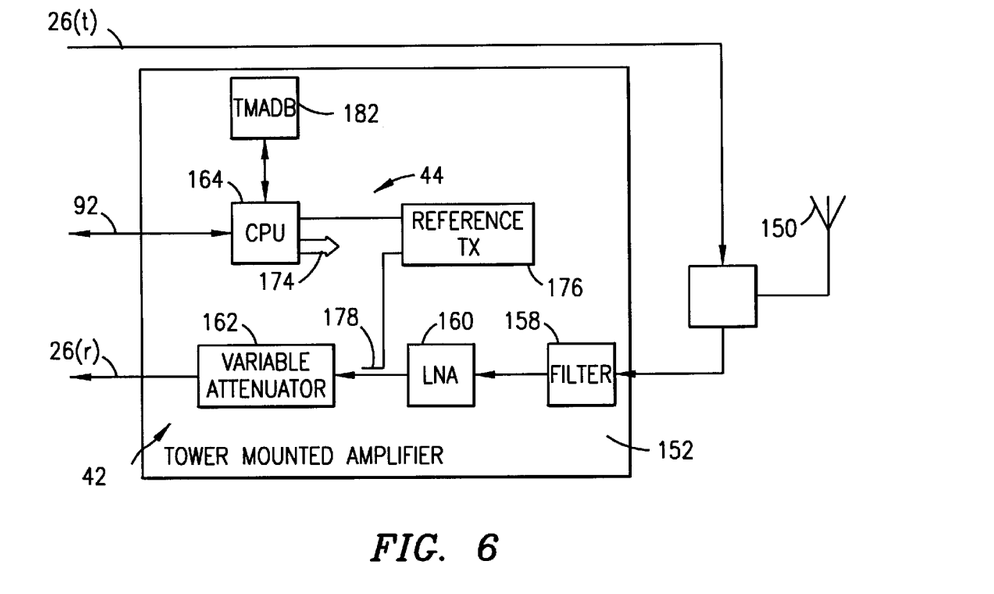
FIG. 6 is a block diagram of a tower mounted amplifier and antenna.

Reference is now made to FIG. 6 wherein there is shown a block diagram of a tower mounted amplifier (TMA) 152. The tower mounted amplifier 152 includes a radio part 42 and a digital part 44. Turning first to the radio part 42, it functions to receive broadcast radio frequency signals and amplify them for reception by the transmitter/receiver pair of the base station. With respect to a receive signal received by an antenna 150, it is routed through a band-pass filter 158 for application to a low noise amplifier (LNA) 160. Next, the receive signal is passed through a variable attenuator 162 which applies a selected attenuation to the signal to compensate for the lower than nominal feeder attenuation associated with the radio frequency feeder 26. The variable attenuator 162 need not be included in the tower mounted amplifier 152 if only a single antenna 150 is connected to its associated transmitter/receiver pair 12, or if multiple antennas with similar feeder attenuation are connected to the same transmitter/receiver pair. A tower mounted amplifier 152 does not require duplex functionality. Accordingly, the radio frequency feeder connection between a transmitter/receiver pair 12 and the antenna 150 may utilize a transmit feeder 26(*t*) separate from a receive feeder 26(*r*).

Turning next to the digital part 44, the tower mounted amplifier 152 includes a central processing unit (CPU) 164 which operates to control operation of the tower mounted amplifier. In particular, through command signals output on bus 174, the central processing unit 164 controls the operation of the low noise amplifier 160. The central processing unit 164 further sends commands to a reference transmitter 176 to generate a radio frequency signal in the base station receiver 22 band. The reference transmitter 176 utilizes a directional coupler 178 to inject this signal onto the radio frequency feeder 26. The directional coupler 178 may be positioned at any selected location on the base station side of the amplifier 160, including before and after the attenuator 162. The central processing unit 164 further specifies the attenuation to be applied by the variable attenuator 162. The digital part 44 of the tower mounted amplifier 152 further includes a tower mounted amplifier database (TMADB) 182 connected to the central processing unit 164. The tower mounted amplifier database 182 stores radio characteristic information including information on: the frequency of the reference transmitter; and the amplitude of the signal generated by the reference transmitter.

Figure 7:
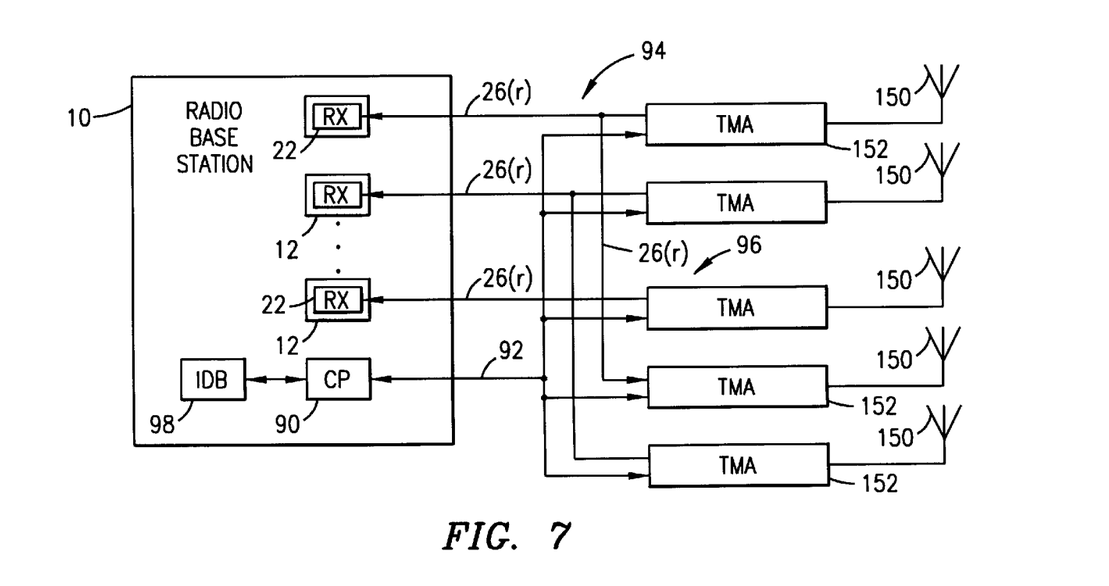
FIG. 7 is a block diagram of a communications system comprising a plurality of receive antennas connected to a radio base station through tower mounted amplifiers.

Reference is now made in combination to FIGS. 1 and 6, as well as to FIG. 7 wherein there is shown a block diagram of a communications system comprising a plurality of antennas 150 connected to a radio base station 10 through tower mounted amplifiers 152. The control processor 90 of the radio base station 10 is connected for data communication to the central processing unit 164 of each tower mounted amplifier 152 via an antenna bus 92. In the preferred embodiment, the antenna bus 92 is shared by all tower mounted amplifiers 152. Alternatively, an antenna bus may be provided between each transmitter/receiver pair 12 and its connected tower mounted amplifiers 152. Each of the included radio frequency feeders 26 may be either utilized in a shared fashion to connect a single transmitter/receiver pair 12 to plural tower mounted amplifiers 152, as generally shown at 94, or utilized to connect a single transmitter/receiver pair 12 to a single tower mounted amplifier, as generally shown at 96.

The installation database (IDB) 98 stores information concerning the connection of equipment for the base station. The installation database 98 may store information identifying the transmitter and receiver radio paths for the connected transmitter/receiver pairs 12 and antenna near parts equipment (such as the tower mounted amplifiers 152). An example transmitter path may comprise a transmitter number, a filter number and input port number, an antenna port number and a booster number. An example receiver path may comprise a tower mounted amplifier number, an antenna port number, a filter number and output port, and a receiver number.

Reference is now made to FIG. 8 and 9A–9C wherein there are shown flow diagrams illustrating a method for automatic configuration of antenna near parts equipment (such as active antennas 40, boosters 132, and tower mounted amplifiers 152). The method, in general, uses data communications over the antenna bus 92 as well as dummy transmission bursts over the radio frequency feeder to update both the transmitter/receiver radio paths stored in the installation database 98 and the configuration (such as selected attenuation to be applied by the variable attenuator 46 of each active antenna 40) of the antenna near parts equipment.

Figure 8:
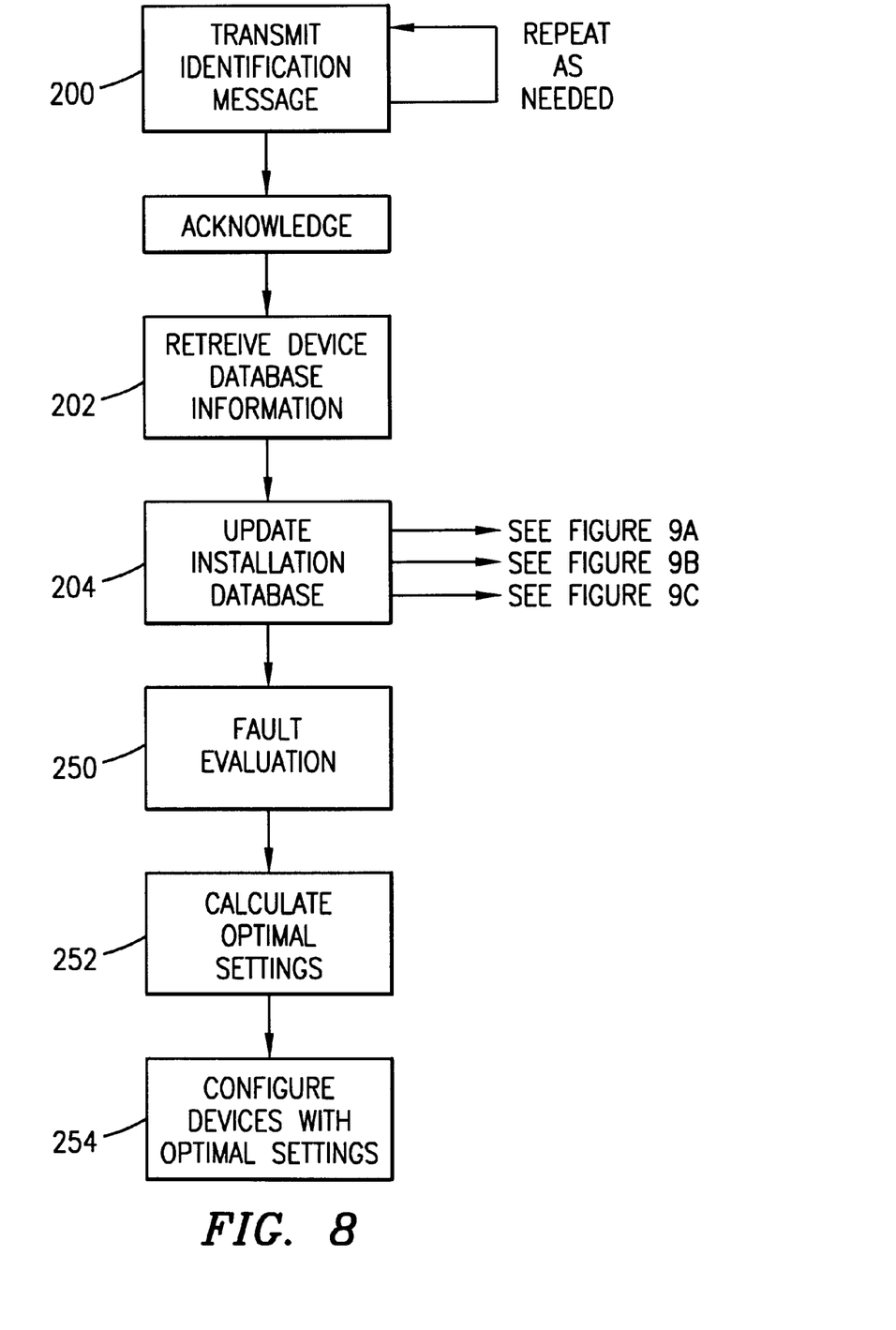
FIGS. 8 and 9A–9C are flow diagrams illustrating a method for automatic configuration of antenna near parts equipment (such as active antennas, boosters, and tower mounted amplifiers).

With specific reference now to FIG. 8, in step 200 each antenna near parts equipment (such as an active antenna 40, booster 132 or tower mounted amplifier 152), following being powered-on, transmits a message over the antenna bus 92 to the radio base station 10 identifying itself. This automatic identification step is most simply done by implementing the antenna bus 92 as a multi-master bus. This means a bus where all devices are allowed to transmit assuming the bus is free. At power-on, the antenna near parts equipment simply sends a message containing its component serial number addressed to the assigned network address of its serving radio base station 10. This message is repeatedly sent until a confirmation is received containing the component serial number and network address of the antenna near parts component. With respect to the radio base station 10, it receives the message, adds the serial number to a list of its served antenna near parts equipment, and returns the acknowledgment message comprising the serial number and logical address.

Further responsive to the message sent in step 200, the radio base station 10 next retrieves in step 202 the information stored in the active antenna database 78, booster database 140 and/or tower mounted amplifier database 182 of the antenna near parts equipment. The installation database 98 is then updated with the current antenna near parts configuration in step 204. The operation of step 204 involves the performance of a number of actions dependent upon the type of antenna near parts equipment at issue.

Figure 9A:
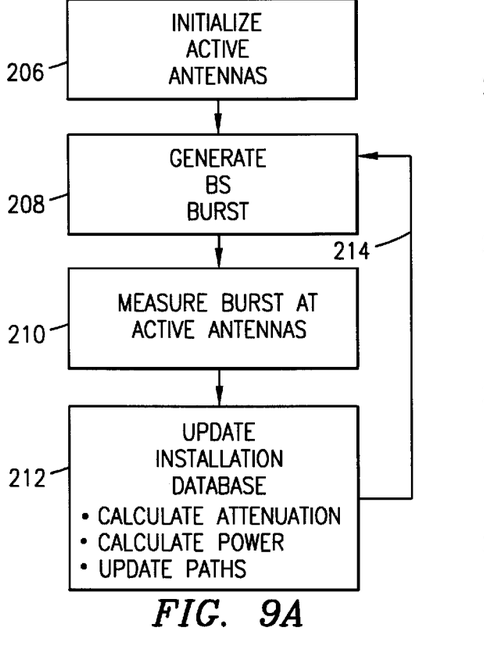
Figure 9B:
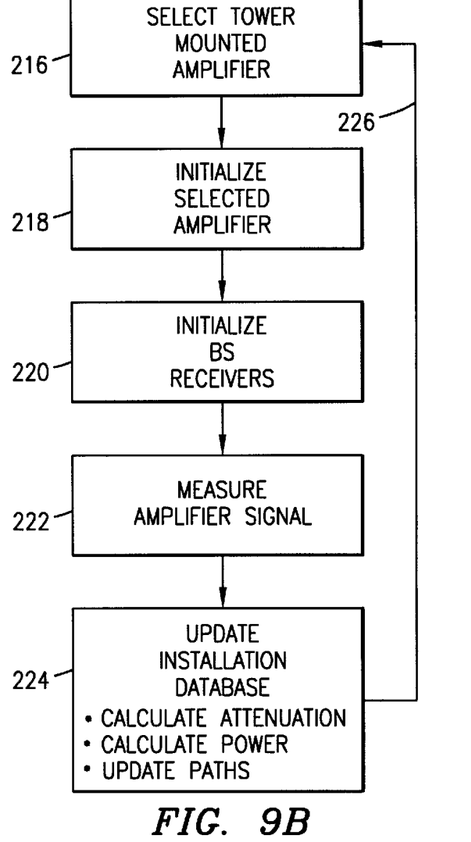
Figure 9C:
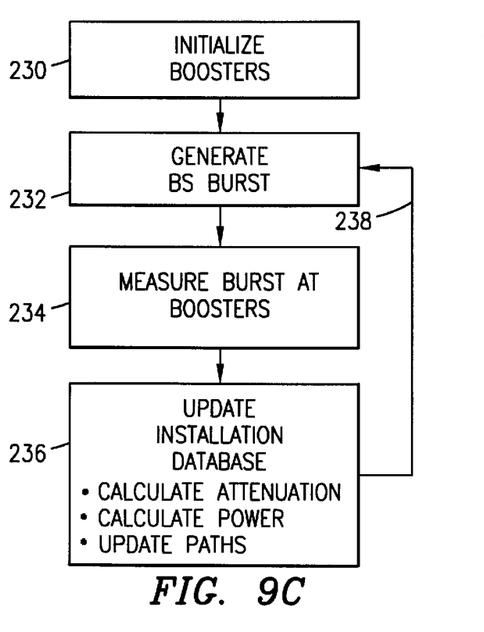

Specific reference is now made to FIGS. 9A–9C for a description of the process performed in connection with the operation of step 204 and the updating of the installation database 98 with the current antenna near parts configuration.

a. Active Antenna Step 204—FIG. 9A

First, in step 206, the active antennas are initialized. This initialization involves the radio base station 10 instructing each active antenna 40 to turn off its power amplifier 54 and set the attenuation of its variable attenuator 46 to minimum attenuation. These instructions are sent over the antenna bus 92.

Second, in step 208, the radio base station 10 outputs a short radio frequency transmit signal burst on a certain transmitter/receiver pair 12. The duration of this burst is set to be as long as the longest of all measurement times required by the measurement receivers 74 of the active antennas 40. The amplitude of this burst is set to a predetermined limit (e.g., −36 dBm) plus the smallest attenuation of the transmit path of the active antennas 40 (with the power amplifier turned off). The frequency of this burst is set to an arbitrary frequency within the transmit frequency band. In the event a connected active antenna 40 does not cover the entire transmit frequency band, a frequency within the supported band is arbitrarily selected. Furthermore, in the event different connected active antennas 40 cover different bands within the transmit frequency band, an arbitrary frequency in the lowest of the supported bands is selected.

If the radio base station 10 cannot transmit at the calculated power, a determination is made as to whether altering the attenuation provided by the variable attenuators of the active antenna would improve the situation. For example, if the calculated output power is below that which can be set in the radio base station, increasing the attenuation provided by the variable attenuators will allow for the setting of a higher radio base station power level. Where increasing the variable attenuator provided attenuation is not sufficient, a notification is provided and the feeder attenuation must be manually entered.

By turning off the power amplifier in step 206, any subsequently transmitted radio signal, such as the short radio frequency transmit signal burst of step 208, would be significantly attenuated (e.g., about 60 dB) in the active antenna. There is little danger then with this level of attenuation, as well as with consideration of the feeder attenuation and the operation of the variable attenuators, of violating any legal or standards related broadcast transmission restrictions with the short radio frequency transmit signal burst of step 208.

Third, in step 210, the active antennas 40 measure the step 208 short radio frequency transmit signal bursts and report their measurements back to the radio base stations 10. These measurements are made by the measurement receiver and are reported back using the antenna bus 92. The radio base station 10 waits for a predetermined delay time period for all active antennas 40 to make their reports. To the extent that different active antennas 40 cover different bands, the actions of steps 208 and 210 are repeated for each band. Any reported measurements from an active antenna 40 utilizing a band different from the band within which the burst was sent are discarded.

In the event that the reported measurement is outside the amplitude measurement range of the active antenna 40, the actions of steps 208 and 210 are repeated with an altered burst amplitude selection. Before altering the power output of the burst, however, the radio base station must first determine that a selected alternate power will not violate any legal or standard based broadcasting restriction. Where such a violation would occur, other solutions, such as altering the attenuation provided by the variable attenuators, are evaluated. If this would not solve the problem, a notification is provided. Measurement in these situations, perhaps caused by the use of very different feeder lengths, could be complemented by manual interaction.

If all of the antennas work in the same part of the band (using part-of-band antennas), the frequency of the dummy burst should be selected within that part. Where the antennas work in different parts of the band (for example, a first transmitter/receiver pair 12 for a lower part and a second transmitter/receiver pair for a higher part), the system does not know which frequency to choose until after the antennas have reported on the transmitter/receiver pair to which they are connected. If a transmission is made in a lower part, and the reporting antenna is for the higher part, a new burst must be sent on a more appropriately selected frequency in order to get a proper calibration value. Similarly, a new burst must be sent when the reported value is outside the measurement range of the antenna measurement receiver.

Fourth, in step 212, the installation database 98 is updated. To accomplish this, the control processor 90 of the radio base station 10 calculates individual attenuation to each active antenna 40 from the reported valid measurements of the amplitude of the step 208 bursts. Calculations are also made of the radio base station output power and the setting for each of the included variable attenuators 46. An update of the stored transmitter/receiver radio paths (as well as attenuator settings) may also be made based on the identification of those active antennas 40 which make measurement reports.

One restriction on this method is that it handles only the transmitter paths (not the receiver paths). This is not, however, a significant concern as the active antennas each include a low noise amplifier in the receiver path. As the radio signals for both paths share the same feeder (duplex), an identification of the transmitter path automatically provides an identification of the receiver path. It is further noted that receive signal feeder loss is nearly the same as the transmit signal feeder loss.

Fifth, the actions of step 208, 210 and 212 are repeated as shown by path 214 for each of the included transmitter/receiver pairs 12 of the radio base station 10.

b. Tower Mounted Amplifier Step 204—FIG. 9B

First, in step 216, a tower mounted amplifier that currently is not configured is selected for configuration.

Second, in step 218, the selected tower mounted amplifier is initialized. This initialization involves the radio base station 10 instructing the selected tower mounted amplifier to turn off its low noise amplifier, set its variable attenuator to a minimum value, and start transmitting with its reference transmitter 176. These instructions are sent over the antenna bus 92. The directional coupler 178 used to inject the signal can be given a certain directivity (for example, the signal towards the radio base station 10 is 30 dB higher than the signal towards the antenna). If the low noise amplifier 160 is turned off, additional isolation from transmitter 16 to the antenna is achieved. This allows for a higher transmitter power which improves the sensitivity of the radio base station 10 detection of the reference transmitter signal.

Third, in step 220, the receivers 22 in the radio base station 10 are initialized. This initialization involves the radio base station 10 instructing each of its receivers 22 in the transmitter/receiver pairs 12 to listen to the frequency of the tower mounted amplifier reference transmitter 176.

Fourth, in step 222, the receivers 22 in the radio base station 10 which receive the signal generated by the tower mounted amplifier reference transmitter 176 measure it.

Fifth, in step 224, the installation database 98 is updated. A calculation is made of the attenuation based upon knowledge of the reference transmitter 176 transmitted signal amplitude. An update of the stored transmitter/receiver radio paths (as well as attenuator settings) may also be made based on the identification of those reference transmitters sending signals that were measured.

Sixth, the actions of step 216, 218, 220, 222 and 224 are repeated as shown by path 226 for each of the included tower mounted amplifiers.

c. Booster Step 204—FIG. 9C

First, in step 230, the boosters are initialized. This initialization involves the radio base station 10 instructing each booster 132 to turn off its power amplifier 136 and set the attenuation of its variable attenuator 134 to minimum attenuation. These instructions are sent over the antenna bus 92.

Second, in step 232, the radio base station 10 outputs a short radio frequency transmit signal burst on a certain transmitter/receiver pair 12. The duration of this burst is set to be as long as the longest of all measurements times required by the measurement receivers 148 of the boosters 132. The amplitude of this burst is set to a predetermined limit (e.g., −36 dBm) plus the smallest attenuation of the transmit path of the boosters 132 with the power amplifier turned off. The frequency of this burst is set to an arbitrary frequency within the transmit frequency band. In the event a connected booster 132 does not cover the entire transmit frequency band, a frequency within the supported band is arbitrarily selected. Furthermore, in the event different connected boosters 132 cover different bands within the transmit frequency band, an arbitrary frequency in the lowest of the supported bands is selected.

If the radio base station 10 cannot transmit at the calculated power, a determination is made as to whether altering the attenuation provided by the variable attenuators of the booster would improve the situation. For example, if the calculated output power is below that which can be set in the radio base station, increasing the attenuation provided by the variable attenuators will allow for the setting of a higher radio base station power level. Where increasing the variable attenuator provided attenuation is not sufficient, a notification is provided and the feeder attenuation must be manually entered.

By turning off the amplifier in step 230, any subsequently transmitted radio signal, such as the short radio frequency transmit signal burst of step 232, would be significantly attenuated (e.g., about 60 dB) in the booster. There is little danger then with this level of attenuation, as well as with consideration of the feeder attenuation and the operation of the variable attenuators, of violating any legal or standards related broadcast transmission restrictions with the short radio frequency transmit signal burst of step 232.

Third, in step 234, the boosters 132 measure the step 232 short radio frequency transmit signal bursts and report their measurements back to the radio base stations 10. These measurements are made by the measurement receiver and are reported back using the antenna bus 92. The radio base station 10 waits for a predetermined delay time period for all boosters 132 to make their reports. To the extent that different boosters 132 cover different bands, the actions of steps 232 and 234 are repeated for each band. Any reported measurements from a booster 132 utilizing a band different from the band within which the burst was sent are discarded.

In the event that the reported measurement is outside the amplitude measurement range of the booster 132, the actions of steps 232 and 234 are repeated with an altered burst amplitude selection. Before altering the power output of the burst, however, the radio base station must first determine that a selected alternate power will not violate any legal or standard based broadcasting restriction. Where such a violation would occur, other solutions, such as altering the attenuation provided by the variable attenuators, are evaluated. If this would not solve the problem, a notification is provided. Measurement in these situations, perhaps caused by the use of very different feeder lengths, could be complemented by manual interaction.

If all of the boosters operate in the same part of the band (using part-of-band boosters), the frequency of the dummy burst should be selected within that part. Where the boosters work in different parts of the band (for example, a first transmitter/receiver pair 12 for a lower part and a second transmitter/receiver pair for a higher part), the system does not know which frequency to choose until after the boosters have reported on the transmitter/receiver pair to which they are connected. If a transmission is made in a lower part, and the reporting booster is for the higher part, a new burst must be sent on a more appropriately selected frequency in order to get a proper calibration value. Similarly, a new burst must be sent when the reported value is outside the measurement range of the measurement receiver.

Fourth, in step 236, the installation database 98 is updated. To accomplish this, the control processor 90 of the radio base station 10 calculates individual attenuation to each booster 132 from the reported valid measurements of the amplitude of the step 232 bursts. Calculations are also made of the radio base station output power and the setting for each of the included variable attenuators 134. An update of the stored transmitter/receiver radio paths (as well as attenuator settings) may also be made based on the identification of those boosters 132 which make measurement reports.

Fifth, the actions of step 232, 234 and 236 are repeated as shown by path 238 for each of the included transmitter/receiver pairs 12 of the radio base station 10.

Reference is now once again made to FIG. 8. Next, following step 204 updating of the antenna near parts configurations, the process performs fault evaluation in step 250. In this action, a determination is made as to whether there is an active antenna 40 known to the radio base station which did not make a measurement report, or there is a tower mounted amplifier 152 whose signal was not measured, or there is a booster 132 known to the radio base station which did not make a measurement report. Such a failure to report may, for example, be caused by the antenna near parts equipment being faulty or the radio frequency feeder being faulty. This action further determines instances where a single active antenna is reported to be connected to more than one transmitter/receiver pair 12 (perhaps caused by a isolation problems between two pairs). In each case of fault, an appropriate message is provided to a system operator so that corrective actions can be taken.

The process next calculates, in step 252, optimal settings for the system based upon the determined attenuation of the radio frequency feeders and the contents of each antenna near parts component database. In particular, a calculation is made as to the optimal attenuation of each of the included variable attenuators 46 or 180, and as to the necessary compensation for each of the transmitters 16 or receivers 22 of an included transmitter/receiver pair 12. Selection by the control processor 90 of system variables for optimal performance at the frequencies used by the radio base station 10 is possible because the radio base station has collected information relating to each of the transmitter/receiver paths.

Lastly, in step 254, the variables calculated for optimal system performance are communicated by the control processor 90 to the central processing unit 70 of the active antenna 40, or central processing unit 142 of the booster 132, or central processing unit 162 of the tower mounted amplifier 152, using commands sent over the antenna bus 92. In particular, the optimal attenuation for each variable attenuator 46 or 180 is sent to the central processing unit 70 and used to configure antenna near parts equipment operation. Furthermore, in appropriate situations, the calculated variables are applied within the base station 10 itself to configure any configurable base station components (such as with respect to the transmitter or receiver) for optimal performance. Lastly, the power amplifier or low noise amplifier that was previously turned off is turned back on again.

Reference is now specifically made to FIGS. 8 and 9A. The operations performed in connection with steps 200 and 202 assume that the active antennas are turned on before the radio base station reaches the point in its power-on procedure that it will start communicating with the active antennas. Any active antenna powered-on after the process reaches step 204 are not included in the configuration. In the event an active antenna is powered-on before step 254, a notification is provided and the process will return to step 200 for a new antenna. In the event an active antenna is powered-on when there is traffic being handled by the radio base station, an alarm notification is provided. The configuration will not include this antenna. However, the new antenna information may be input into the installation database, or the transmitter/receiver pair 12 to which that antenna is connected must be re-set.

The foregoing procedures are also effective (with appropriate modifications where necessary) to handle configurations utilizing boosters and tower mounted amplifiers.

The method of FIGS. 8 and 9A is further useful in handling the situation where the antenna configuration of a transmitter/receiver pair 12 is changed at a point in time where the remaining transmitter/receiver pairs of a radio base station 10 are operating and carrying traffic. The following slight modifications to the method need to be made to handle this situation:

in step 200, any antennas that were on the antenna bus prior to the reconfiguration are searched for and found. A failure to answer commands from the radio base station results in the consideration of the antennas as being removed.

in step 202, the active antenna database of the antennas which were present on the antenna bus before the change are not loaded since they were previously stored in the radio base station.

in step 206, the actions of this step are only made as to the antennas not connected to other transmitter/receiver pairs 12.

in steps 208, 210 and 212, the actions of these steps are only made as to the reset transmitter/receiver pair 12.

in step 250, if the antenna makes a measurement report before the burst has been sent, it is like over-hearing traffic from another transmitter/receiver pair 12. This is indicative of an isolation problem, and an appropriate notification is provided.

The foregoing procedures are also effective (with appropriate modifications where necessary) to handle configurations utilizing boosters and tower mounted amplifiers.

Some noted benefits arising from use of the method of the present invention include: the method makes accurate measurement of system status without any (or little) human interaction; the automatic configuration process may be completed accurately and quickly; all antenna near parts equipment connected to the antenna bus are identified and faulty radio frequency feeders are found, thus giving rise to enhanced fault localization; and automatic feeder attenuation calibration is supported.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for automatic configuration of a system comprising antenna near parts equipment connected to a radio base station via a radio frequency feeder and communications link, comprising the steps of:

downloading radio configuration information relating to the antenna near parts equipment from a first database in the antenna near parts equipment to a second database in the radio base station via the communications link;

transmitting a short radio burst over the radio frequency feeder;

measuring the short radio burst by the antenna near parts equipment;

reporting of the antenna near parts equipment measurement of the short radio burst to the radio base station via the communications link;

processing the reported measurement in view of the downloaded radio configuration information to obtain calibration data for configuring the system for optimal operation;

sending the calibration data to the antenna near parts equipment via the communications link; and adjusting the calibration of a configurable component of the antenna near parts equipment in accordance with the sent calibration data to provide optimal performance.

2. The method as in claim 1 wherein the short radio burst has a predetermined duration, amplitude and frequency.

3. The method as in claim 2 wherein the duration is set to a largest of measurement times required by the antenna near parts equipment in measuring the short radio burst.

4. The method as in claim 2 wherein the amplitude is set to a predetermined limit authorized for broadcast plus a transmit path attenuation.

5. The method as in claim 2 wherein the frequency is set to an arbitrary frequency in a transmit band supported by the antenna near parts equipment.

6. The method as in claim 1 wherein the antenna near parts equipment comprises an active antenna.

7. The method as in claim 1 wherein the antenna near parts equipment comprises a booster.

8. The method as in claim 1 wherein the antenna near parts equipment includes a variable attenuator, and the calibration data comprises an attenuation to be set on the variable attenuator.

9. The method as in claim 1 wherein the antenna near parts equipment includes an amplifier, and the calibration data comprises an amplification to be applied by the amplifier.

10. The method as in claim 1 further including the step of processing the reports of the antenna near parts equipment measurement of the short radio burst to identify faults.

11. A method for automatic configuration of a system comprising antenna near parts equipment connected to a radio base station via a radio frequency feeder and communications link, comprising the steps of:
    downloading radio configuration information relating to the antenna near parts equipment from a first database in the antenna near parts equipment to a second database in the radio base station via the communications link;
    transmitting a reference radio signal over the radio frequency feeder;
    measuring the reference radio signal by the radio base station;
    processing the measurement in view of the downloaded radio configuration information to obtain calibration data for configuring the system for optimal operation;
    sending the calibration data to the antenna near parts equipment via the communications link; and
    adjusting the calibration of a configurable component of the antenna near parts equipment in accordance with the sent calibration data to provide optimal performance.

12. The method as in claim 11 wherein the antenna near parts equipment comprises a tower mounted amplifier.

13. The method as in claim 11 wherein the antenna near parts equipment includes a variable attenuator, and the calibration data comprises an attenuation to be set on the variable attenuator.

14. The method as in claim 11 wherein the antenna near parts equipment includes an amplifier, and the calibration data comprises an amplification to be applied by the amplifier.

15. The method as in claim 11 further including the step of processing the measurement of the reference radio signal to identify faults.

16. An automatic configuration system, comprising:
    antenna near parts equipment including a measurement receiver for making measurements on a received radio burst, the antenna near parts equipment reporting measured radio burst information and radio configuration information relating to the antenna near parts equipment;
    at least one configurable component within the antenna near parts equipment;
    a radio base station including:
        at least one transmitter/receiver pair operable to generate the radio burst for transmission to the antenna near parts equipment; and
        a control processor for processing the reported antenna near parts measured radio burst information and radio configuration information to obtain calibration data for transmission back to the antenna near parts for configuring the at least one configurable component for optimal operation;
    radio frequency feeders connecting the antenna near parts equipment to the at least one transmitter/receiver pair over which the radio burst is sent; and
    a communications link connecting the antenna near parts equipment to the control processor and over which the measured radio burst information, radio configuration information and calibration data is sent.

17. The system as in claim 16 wherein the communications link comprises a multi-master antenna bus connecting the control processor to all antenna near parts equipment.

18. The system as in claim 16 wherein the antenna near parts equipment comprises an active antenna.

19. The system as in claim 16 wherein the active antenna includes a power amplifier, and wherein the control processor of the radio base station instructs the active antenna to turn-off the power amplifier while the measurement receiver makes the radio burst measurements.

20. The system as in claim 16 wherein the at least one configurable component comprises a variable attenuator, and the calibration data comprises an attenuation to be set on the variable attenuator.

21. The system as in claim 16 wherein the at least one configurable component comprises an amplifier, and the calibration data comprises an amplification to be applied by the amplifier.

22. The system as in claim 16 wherein the antenna near parts equipment comprises a booster.

23. The system as in claim 16 wherein the radio burst has a predetermined duration, amplitude and frequency.

24. The system as in claim 23 wherein the duration is set to a largest of measurement times required by the measurement receiver.

25. The system as in claim 23 wherein the amplitude is set to a predetermined limit authorized for broadcast plus a transmit path attenuation.

26. The system as in claim 23 wherein the frequency is set to an arbitrary frequency in a transmit band supported by the antenna near parts equipment.

27. An automatic configuration system, comprising:
    antenna near parts equipment including a reference transmitter for generating a reference radio signal and a database storing radio configuration information relating to the antenna near parts equipment;
    at least one configurable component within the antenna near parts equipment;
    a radio base station including:
        a plurality of transmitter/receiver pairs operable to receive and measure the reference radio signal generated by the antenna near parts equipment; and
        a control processor for processing the measured reference radio signal and radio configuration information downloaded from the database to obtain calibration data for transmission back to the antenna near parts for configuring the at least one configurable component for optimal operation;

radio frequency feeders connecting the antenna near parts equipment to the at least one transmitter/receiver pair over which the reference radio signal is sent; and a communications link connecting the antenna near parts equipment to the control processor and over which the radio configuration information and calibration data is sent.

28. The system as in claim 27 wherein the communications link comprises a multi-master antenna bus connecting the control processor to all antenna near parts equipment.

29. The system as in claim 27 wherein the antenna near parts equipment comprises a tower mounted amplifier.

30. The system as in claim 29 wherein the tower mounted amplifier includes a low noise amplifier, and wherein the control processor of the radio base station instructs the tower mounted amplifier to turn-off the low noise amplifier while the reference transmitter generates the reference radio signal.

31. The system as in claim 27 wherein the at least one configurable component comprises a variable attenuator, and the calibration data comprises an attenuation to be set on the variable attenuator.

32. The system as in claim 27 wherein the at least one configurable component comprises an amplifier, and the calibration data comprises an amplification to be applied by the amplifier.

33. A method for automatic connectivity identification within a system comprising antenna near parts equipment connected to a radio base station via a radio frequency feeder and communications link, comprising the steps of:

downloading radio configuration information relating to the antenna near parts equipment from a first database in the antenna near parts equipment to a second database in the radio base station via the communications link;

providing in a message sent from the antenna near parts equipment itself to the radio base station via the communications link an identification of the antenna near parts equipment;

transmitting a short radio burst over the radio frequency feeder;

measuring the short radio burst by the antenna near parts equipment;

reporting of the antenna near parts equipment measurement of the short radio burst to the radio base station via the communications link; and processing the reported measurement in view of the downloaded radio configuration information and antenna near parts equipment identification to identify connectivity between a transmitter/receiver pair of the radio base station and the antenna near parts equipment.

34. The method as in claim 33 wherein the antenna near parts equipment comprises an active antenna.

35. The method as in claim 33 wherein the antenna near parts equipment comprises a booster.

36. A method for automatic connectivity identification within a system comprising antenna near parts equipment connected to a radio base station via a radio frequency feeder and communications link, comprising the steps of:

downloading radio configuration information relating to the antenna near parts equipment from a first database in the antenna near parts equipment to a second database in the radio base station via the communications link;

providing in a message sent from the antenna near parts equipment itself to the radio base station via the communications link an identification of the antenna near parts equipment;

transmitting a reference radio signal over the radio frequency feeder;

measuring the reference radio signal by the radio base station; and processing the measurement in view of the downloaded radio configuration information and antenna near parts equipment identification to identify connectivity between a transmitter/receiver pair of the radio base station and the antenna near parts equipment.

37. The method as in claim 36 wherein the antenna near parts equipment comprises an active antenna.

38. The method as in claim 36 wherein the antenna near parts equipment comprises a booster.

39. An automatic connectivity identification system, comprising:

antenna near parts equipment including a measurement receiver for making measurements on a received radio burst, the antenna near parts equipment reporting measured radio burst information;

a radio base station including:
  at least one transmitter/receiver pair operable to generate the radio burst for transmission to the antenna near parts equipment; and
  a control processor for receiving in a message sent from the antenna near parts equipment itself via the communications link an identification of the antenna near parts equipment, and for processing the antenna near parts measured radio burst information in view of radio characteristics information and antenna near parts equipment identification to identify connectivity between the at least one transmitter/receiver pair and the antenna near parts equipment;

radio frequency feeders connecting the antenna near parts equipment to the at least one transmitter/receiver pair over which the radio burst is sent; and a communications link connecting the antenna near parts equipment to the control processor and over which the measured radio burst information is sent.

40. An automatic connectivity identification system, comprising:

antenna near parts equipment including a reference transmitter for generating a reference radio signal;

a radio base station including:
  a plurality of transmitter/receiver pairs operable to receive and measure the reference radio signal generated by the antenna near parts equipment; and
  a control processor for receiving in a message sent from the antenna near parts equipment itself via the communications link an identification of the antenna near parts equipment, and for processing the antenna near parts measured radio burst information in view of radio characteristics information and antenna near parts equipment identification to identify connectivity between the at least one transmitter/receiver pair and the antenna near parts equipment;

radio frequency feeders connecting the antenna near parts equipment to the at least one transmitter/receiver pair over which the reference radio signal is sent; and a communications link connecting the antenna near parts equipment to the control processor.

* * * * *